United States Patent [19]

Shimamoto et al.

[11] 3,757,470
[45] Sept. 11, 1973

[54] APPARATUS FOR HYDROPONIC CULTIVATION UTILIZING CATION EXCHANGER

[76] Inventors: Takatsugu Shimamoto, 590 Osaka-fu, Ishizu-Kita-machi, 64-banchi, Sakai; Yasumasa Kato, 386 Nagano-ken, Midorigaoka 1-chome, 25-ban, Ueda, both of Japan

[22] Filed: Dec. 3, 1971

[21] Appl. No.: 204,456

[30] Foreign Application Priority Data
Aug. 18, 1971  Japan.............................. 46/44056

[52] U.S. Cl. ................................................. 47/1.2
[51] Int. Cl. .......................................... A01g 31/02
[58] Field of Search .................. 47/34, 1.2, 38, 38.1

[56] References Cited
UNITED STATES PATENTS
2,026,322  12/1935  Raines .................................... 47/38
2,270,518  1/1942  Ellis et al. .......................... 47/1.2 X
2,988,441  6/1961  Pruitt .............................. 47/1.2 UX
3,082,074  3/1963  Handley et al. ................. 47/1.2 UX FOREIGN PATENTS OR APPLICATIONS
7,014,511  4/1971  Netherlands
183,529  8/1966  U.S.S.R.

*Primary Examiner*—Robert E. Bagwill
*Attorney*—Edwin E. Greigg

[57] ABSTRACT

An apparatus for hydroponic cultivation of plants based on the principle of establishing contact between the root of a plant suspended and held in position and a screen having cation exchangeability, supplying nutrient solution to the screen allowing the nutrient solution to flow down along the screen while ensuring sufficient contact of the root with the nutrient solution and air, allowing the iron component in the nutrient solution to be absorbed by the screen in the form of ions through cation exchange so as to prevent the shortage of iron compound supply for the plant, thereby preventing the decay of the root and ensuring the sufficient supply of iron component to the root.

13 Claims, 1 Drawing Figure

PATENTED SEP 1 1 1973
3,757,470
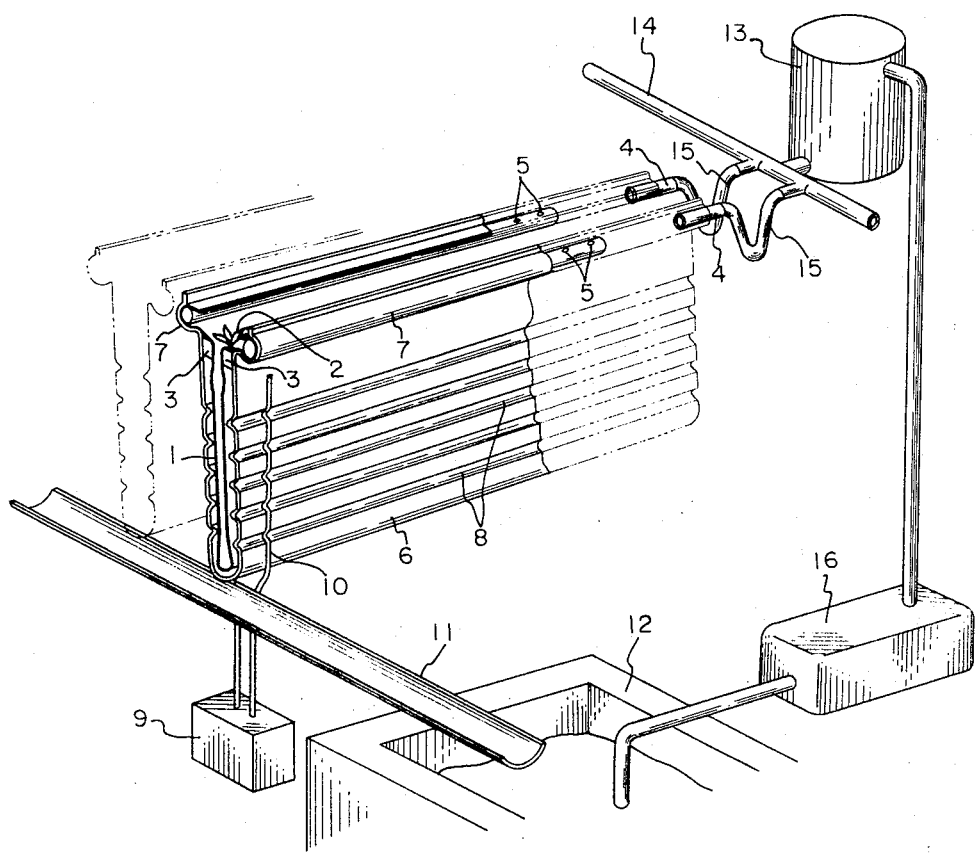

APPARATUS FOR HYDROPONIC CULTIVATION UTILIZING CATION EXCHANGER

BACKGROUND OF THE INVENTION

The conventional apparatus for hydroponic cultivation is of either the type designed to immerse the root of a plant in nutrient solution to allow it to absorb the nutriment or the type designed to allow the root to grow in sand or gravel holding nutrient solution in the interstices between sand or gravel particles to allow the root to absorb the nutriment. With such conventional types, the shortage of iron and oxygen supply to the root of a plant easily takes place so that it has been impossible to attain satisfactory growth of plants. That is, in order for iron component to be absorbed, iron component must be present in the form of ions, but if iron component is supplied as it is contained in nutrient solution as described above, it combines with hydroxyl groups to form iron hydroxide which precipitates. As a result, iron component cannot be absorbed by the root, causing the shortage of iron supply.

Further, if iron ions and phosphate ions coexist in nutrient solution, these ions combine with each other to form iron phosphate which prescipitates, thus frequently causing the shortage of iron supply. Thus it has been an important subject how to solve such iron shortage.

Further, since the root of a plant is permanently immersed in nutrient solution or present in the sand or gravel interstices, the circulation of air for the root is poor, resulting in the shortage of oxygen supply to the root, which has been the cause of root decay.

As a result of our intensive researches, we have accomplished an apparatus for hydroponic cultivation of plants which is capable of solving said problems, i.e., iron shortage and root decay at the same time.

SUMMARY OF THE INVENTION

The present invention relates to an apparatus for hydroponic cultivation capable of reliably and easily supplying sufficient iron and oxygen supply to the root of a plant to ensure satisfactory growth of the plant.

The invention is based on the principle of suspending a plant at its root collar as by sponges to position the root of the plant in the air so as not to interfere with the growth of the plant while maintaining the root in contact with fresh air, installing a screen having cation exchangeability on at least one side of the root, said screen extending vertically and horizontally over suitable distances, contacting the root with said screen, supplying nutrient solution to the screen allowing it to flow down along the screen so that the root is allowed to absorb the nutriment retained by the screen, thereby effecting the supply of necessary and sufficient nutriment.

Since nutrient solution is supplied to the screen having cation exchangeability which, in turn, imparts nutriment to the root of a plant in the manner described above, the iron component in the nutrient solution can be fully and reliably absorbed by the root of the plant. That is, in order for iron component to be absorbed, it must be present in the form of ions, but the iron ions are adsorbed by the screen through cation exchange, so that the formation of iron hydroxide due to the combination between iron ions and hydroxyl groups is prevented and the iron ions adsorbed by the screen are imparted to the root, whereby the shortage of iron supply to the plant is positively prevented. Further, in the case where iron ions and phosphate ions coexist in nutrient solution, the formation and precipitation of iron phosphate due to the combination between the phosphate ions and iron ions in the nutrient solution is also prevented by the adsorption of iron ions by the screen, so that the shortage of iron supply is positively prevented. Further, because of the buffer capacity of the screen having cation exchangeability, there will be no sharp variation in hydrogen exponent.

Further, the root of the plant is always in contact with air, the possibility of root decay and undergrowth due to excessive moisture and oxygen shortage is positively avoided so that satisfactory growth of plants by hydroponic cultivation is ensured.

An object of the invention is to provide an apparatus for hydroponic cultivation capable of reliably supplying the root of a plant with sufficient nutriment, especially iron and oxygen supply.

Another object of the invention is to provide an apparatus which is easy of construction and requires minimum maintenance in avoiding iron shortage and root decay.

A further object of the invention is to provide an apparatus for hydroponic cultivation wherein hydrogen exponent variation is minimized.

An additional object of the invention is to provide an apparatus for hydroponic cultivation which is capable of sufficiently and reliably supplying plants with not only iron component but also anionic nutriment such as phosphates.

BRIEF DESCRIPTION OF THE DRAWING

The drawing shows a perspective view of an apparatus according to the present invention, with some parts being omitted, for the sake of clarity.

DESCRIPTION OF THE PREFERRED EMBODIMENT

A preferred embodiment of the apparatus for hydroponic cultivation according to the present invention will now be described with reference to the accompanying drawing.

Referring to the drawing, the numeral 1 denotes a screen capable of retaining nutrient solution, which screen is bent substantially in U-shape to form two substantially parallel inner surfaces and suspended. The screen 1 is a sheet or a woven fabric made of a cation exchange resin, which is a high molecular compound having acidic groups such as hydroxyl groups, carboxyl groups, sulfonic groups and phosphate groups joined to a parent synthetic resin. For example;

a. Acrylonitrile ($CH_2 = CHCN$) type polymers or copolymers wherein a cyanic group is substituted by a carboxyl group (—COOH) through hydrolysis;
b. Polyvinyl alcohol type fibers which are acetalized and then sulfonated, having a sulfonic group (—$SO_3H$) as the terminal group; and
c. Polyvinyl alcohol type fibers having phosphate groups (—$H_2PO_4$) incorporated therein.

The screen 1 having cation exchangeability is allowed to adsorb the iron ions in nutrient solution and imparts said adsorbed iron ions to the root. Further, phosphate ions are also contained in the nutrient solution applied to the screen, so that such phosphate ions are supplied to the root.

The screen 1 is disposed extending vertically over a suitable distance so as not to interfere with the growth of plants and also extending horizontally over a suitable distance to act on a plurality of plants.

Further, the use of cation exchange resin together with anion exchange resin would be preferable since nutriment in the form of anion such as phosphate could be sufficiently imparted. As the anion exchange resin, use may be made, for example, of:

a. Polyvinyl alcohol fibers which are acetalized and then aminoated; and
b. Vinyl chloride fibers which are aminoated.

The plants 2 are suspended at their root collars held between sponges 3. The roots of the plants 2 are in contact with said screen and positioned in the air so that sufficient supply of oxygen is ensured. Various means may be employed for holding the plants 2 in contact with the screen 1.

Numeral 4 denotes a tubular member (pipe), which is bored with a number of discharge apertures 5 which are longitudinally arranged side by side, and nutrient solution flowing out through the discharge apertures 5 is supplied to the screen 1 from above. The nutrient solution flows down along the screen 1, during which it is retained over the entire surface of the screen, so that the roots of the plants 2 absorb the nutriment from the screen 1. Therefore, the roots do not become immersed in the nutrient solution and hence excessive moistening of the roots is prevented.

Numeral 6 denotes a plate which is bent substantially U-shape to form two planes facing each other, which have rebent portions 7 at the outwardly extending upper edges. The tubular members 4 are respectively fitted in the rebent portions 7 and are thereby held therein and the tubular members 4 cooperate with the plate 6 to hold the screen 1 therebetween. The discharge apertures 5 in the two tubular members 4 are opposed to the inner surfaces of the rebent portions 7 and covered with the screen 1, so that the nutrient solution flows down uniformly over the entire surface of the screen 1. For uniformly supplying the screen 1 with the nutrient solution, instead of the tubular members 4 it is possible to use the rebent portions 7 as gutters, or utilize other means.

Both lateral surfaces of the plate 6 are provided with receiving grooves 8 arranged in a plurality of rows, and pillars 10 erected on support blocks 9 are provided with projections adapted to be resiliently fitted in said receiving grooves 8. The plate 6 is held between the pillars 10.

Such gutter-like body 6 is capable of elastic deformation in such a manner that the two tubular members 4 move away from each other. Thus, it is effective even in the case where the growth of the root is of utmost importance, such as a radish.

The bottom surfaces of the plate 6 is laterally inclined, so that the nutrient solution flowing down along the screen 1 is received on the bottom surface of the plate 6 and is then recovered by a storage tank 12 from a plurality of plates 6 via an inclined guide gutter 11. A pipe 14 and flexible inflow pipes 15 establish communication between the tubular members 4 of the plates 6 and an upper tank 13, and a power driven liquid-lifting pump 16 lifts the nutrient solution from the storage tank 12 to pour it into the upper tank 13, thus constituting means for circulating the nutrient solution for re-use.

Therefore, it is possible to carry out satisfactory growth of plants while avoiding the decay of the roots by preventing the roots from being immersed in the nutrient solution. Further, it is possible to carry out satisfactory control of nutrient solution supply by means of a simple apparatus requiring minimum labor and in a reliable manner.

That which is claimed is:

1. An apparatus for hydroponic cultivation of plants comprising, in combination:

a. at least one deformable screen member open at its upper end and having two spaced apart substantially parallel inner surfaces, the space between said two inner surfaces being suitable for accommodating the root collar and root of at least one plant, said screen member having cation exchangeability;

b. means in contact with said screen member in the vicinity of its uppermost portion near said upper end for holding said screen member suspended in a space where air is freely ventilated, said means for holding said screen member having two spaced apart inwardly facing surfaces;

c. resilient force applying means for exerting pressing forces inwardly on said screen member and thence on the root collar of at least one plant to suspend the plant between said inner surfaces of said screen member with its root in contact therewith, said resilient force applying means being positioned between outer surfaces of said screen member near its uppermost portion and said inwardly facing surfaces of said means for holding said screen member;

d. means in fluid communication with said inner surfaces of said screen member for feeding nutrient-containing liquid to each said inner surface, which liqud can flow downwardly along each of these surfaces;

e. means beneath said screen member for collecting the nutrient-containing liquid which has passed along said inner surfaces of said screen member; and f. means in contact with said means for holding for supporting said means for holding and thence said screen member in space; whereby iron shortages are avoided, root decay is at least substantially reduced and the space between the two inner surfaces of said screen member expands as the plant grows and the root collar of the plant exerts forces on the screen member and thence on the resilient force applying means causing the two inner surfaces of the screen member to spread apart at least along parts of their lengths.

2. An apparatus for hydroponic cultivation as set forth in claim 1, wherein said screen member also has anion exchangeability.

3. An apparatus for hydroponic cultivation as set forth in claim 1, further comprising power driven liquid lifting pump means for supplying collected nutrient-containing liquid to said means for feeding nutrient-containing liquid.

4. An apparatus for hydroponic cultivation as set forth in claim 1, wherein said means for holding said screen member comprises a plate bent substantially in U-shape to provide said two inwardly facing surfaces, its bent portion being positioned lowermost;

wherein said resilient force applying means comprises two sponges positioned on each of said two inwardly facing surfaces of said plate, said bent portion of said plate being positioned below said sponges and said sponges being in contact with said screen member;

wherein said means for feeding nutrient-containing liquid comprises two perforated tubular members positioned substantially horizontally on each of said two inwardly facing surfaces of said plate remote from said bent portion thereof and a pump for delivering liquid to said tubular members, said perforations in said tubular members being arranged in an axial direction for allowing the nutrient-containing liquid to flow out, upper edge portions of said screen member being held between said tubular members and said plate, and said screen member being suspended in space between said two inner surfaces of said plate and itself being bent substantially in U-shape; and wherein said means for collecting the nutrient-containing liquid comprises a trough defined by said bent portion of said plate which receives the nutrient-containing liquid which has flowed down along said screen member and a storage tank for receiving the nutrient-containing liquid from said trough, said pump means lifting the liquid to said storage tank and said tubular members being in contact with said storage tank.

5. An apparatus for hydroponic cultivation as set forth in claim 4, wherein said plate includes at its oppositely disposed upper edges rebent portions for holding said tubular members therein, and said screen member includes portions which are held in said rebent portions by said tubular members.

6. An apparatus for hydroponic cultivation as set forth in claim 4, wherein said screen member is in intimate contact with said perforations in said tubular members.

7. An apparatus for hydroponic cultivation as set forth in claim 4, wherein said plate is flexible and includes upper edge portions which move transversely as the plants grow.

8. An apparatus for hydroponic cultivation as set forth in claim 4, wherein said tubular members are coupled to said storage tank by flexible conduit means, and wherein said means for supporting said means for holding constitutes means for adjustably supporting said plate means, said plate means being vertically movable with respect to said means for supporting.

9. An apparatus for hydroponic cultivation as set forth in claim 1, wherein said screen member comprises a water-permeable sheet.

10. An apparatus for hydroponic cultivation as set forth in claim 1, wherein said screen member has a surface active wetting agent applied thereto.

11. An apparatus for hydroponic cultivation as set forth in claim 1, wherein said screen member comprises a water-impermeable sheet.

12. An apparatus for hydroponic cultivation as set forth in claim 1, wherein said screen member has a napped surface.

13. An apparatus for hydroponic cultivation as set forth in claim 1, wherein said nutrient-containing liquid comprises a nutrient containing solution.

* * * * *